No. 846,424.
PATENTED MAR. 5, 1907.
C. PELMULDER.
AUTOMATIC HOG WATERER.
APPLICATION FILED FEB. 2, 1906.
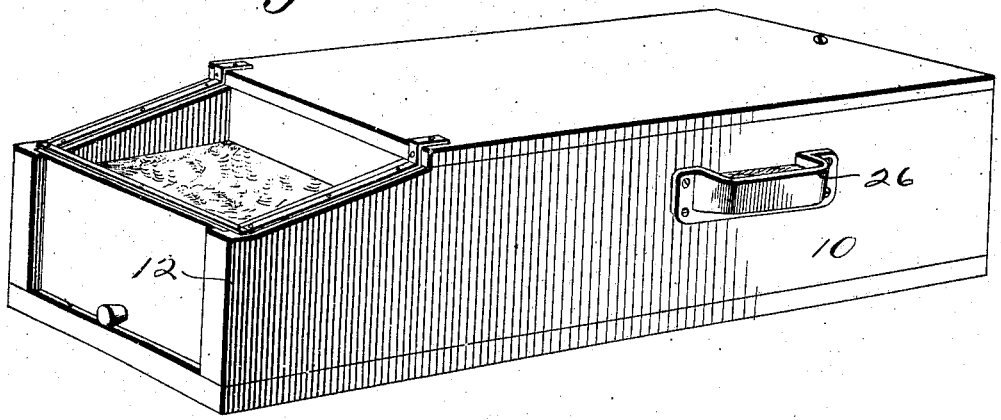
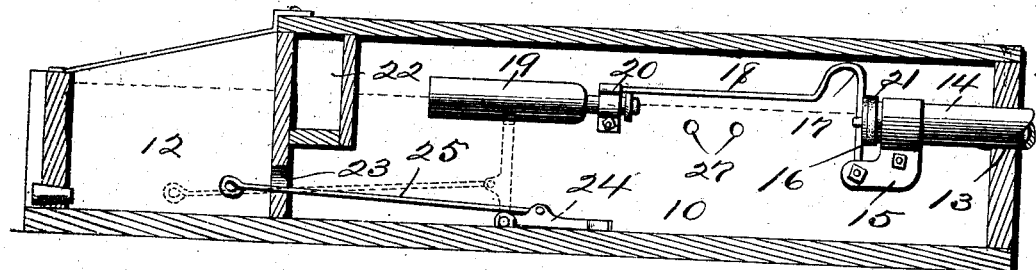
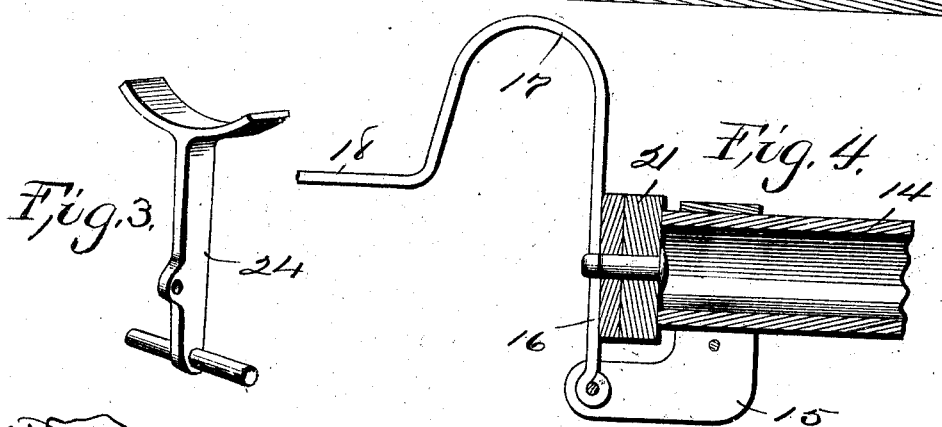
Witnesses:
R. C. Orwig
R. H. Orwig
Inventor: Charles Pelmulder,
By Thomas G. Orwig, Atty.

UNITED STATES PATENT OFFICE.

CHARLES PELMULDER, OF GRANT CITY, IOWA.

AUTOMATIC HOG-WATERER.

No. 846,424.　　　　Specification of Letters Patent.　　　　Patented March 5, 1907.

Application filed February 2, 1906. Serial No. 299,654.

*To all whom it may concern:*

Be it known that I, CHARLES PELMULDER, a citizen of the United States, residing at Grant City, in the county of Sac and State of Iowa, have invented a new and useful Automatic Hog-Waterer, of which the following is a specification.

My object is, first, to reduce the cost of construction and improve the operation of automatic stock-watering fountains; second, to prevent water from freezing and making the valve-operating mechanism inoperative; third, to provide auxiliary fountains for chickens to coact with the stock-fountain; fourth, to provide for making the fountain inoperative at pleasure by simply pulling a lever.

Figure 1 is a perspective view of the structure. Fig. 2 is a longitudinal sectional view and shows the positions of all the operative parts relative to each other and the trough. Fig. 3 is a perspective view of the float support. Fig. 4 is an enlarged sectional view that shows how the valve-support is connected with the end of the supply-pipe.

My invention consists in the construction, arrangement, and combination of elements and subcombinations, as hereinafter set forth, pointed out in my claims, and illustrated in the accompanying drawings, in which the numeral 10 designates a wooden trough that may vary in dimensions as desired. It has an extension 12 at one end, that is uncovered and adapted to admit the noses of animals as required to drink water therefrom. One end of the covered trough has an aperture 13, that allows water to flow into it through a supply-pipe 14, fixed in the aperture and extended into a tank or other source of water-supply.

An elbow-shaped valve-support 15 is connected with the inner end of the supply-pipe, as shown in Figs. 2 and 4, or in any other suitable way as required for pivotally connecting a valve and a float therewith.

A valve-stem 16 made of a single piece of wire by bending one end portion into an arch 17, that will project vertically while the other straight end portion 18 extends horizontally and is connected with a float 19, preferably a bottle, by means of a collar 20, fixed to the wire and clamped fast to the float by means of a screw bolt and nut, as shown in Fig. 2, or in any other suitable way that will allow the rise and descent of the float to actuate a valve fixed to the arched part 17 to open and close the end of the supply-pipe 14. To the vertical portion of the arch 17 is fixed a valve 21 in such position that it will engage the open end of the supply-pipe as required to close it to stop the flow of water therefrom when a sufficient quantity has entered the trough to elevate the float into position as shown and to allow the extension 12 to be filled as required to allow animals during cold weather to drink therefrom.

A dead-air chamber 22 is provided contiguous to the top of the extension, as shown in Fig. 2, or in any other suitable way, to prevent water from freezing and closing the aperture 23, through which water passes from the trough into the uncovered chamber of the extension 12.

It is obvious the circulation of cold air admitted into the trough will aid a cold exterior atmosphere in freezing water in the open extensions at the end of the trough and that the confined air in the dead-air chamber will always be of a higher temperature than the air in the trough, and consequently will aid materially in modifying the temperature of the air and water that pass from the closed trough into the open-ended extension.

A support 24 for the float is pivoted in the lower part of the trough and immediately under the float, and a rod 25 is pivotally connected therewith and extended out through the aperture, as shown in Fig. 2, in such a manner that a person can pull the rod outward, and thereby elevate the support to engage the float, as indicated by dotted lines in Fig. 2, as required to retain the valve closed to prevent water flowing from the supply-pipe into the trough.

An auxilliary fountain 26 is fixed to the outside of the trough, as shown in Fig. 1, at such an elevation that water flowing into it from the trough through an aperture 27 (shown in Fig. 2) will not overflow from the auxiliary fountain.

In the practical use of my invention during cold weather I place manure, ground, or other suitable material around and over all of the trough excepting the extension 12, from which animals will drink. The dead air-chamber 22, contiguous to said extension and immediately over the aperture 23, through which water flows from the trough into the extension, will materially aid in preventing water from freezing and closing said aperture and communication between the trough and the extension.

Having thus set forth the purposes of my invention and described the construction and manner of use, its practical operation and utility will be understood by persons familiar with the art to which it pertains.

What I claim as new, and desire to secure by Letters Patent, is—

1. In an automatic hog-waterer, a closed trough, a dead-air chamber in one of its end walls, an aperture in the end wall below the dead-air chamber, an open-topped extension from the apertured end wall, a supply-pipe, a valve-support on the inner end of the supply-pipe, a valve-stem pivoted to the valve-support and a valve and a float fixed to the valve-stem, a float-support pivoted in the trough and a rod connected therewith and extended through the aperture in the end of the trough into the open-topped chamber, arranged and combined to operate as set forth.

2. An automatic hog-waterer, comprising a trough, a fixed cover on the trough, an open-topped extension at the same end of the trough, a dead-air chamber in the end of the trough, an aperture in the end wall of the trough below said dead-air chamber, a supply-pipe fixed in the other end of the trough, a valve-support clamped to the end of said pipe, a valve-stem pivotally connected with the valve-support, a float fixed to the end portion of the valve-stem, a valve fixed to the valve-stem to engage the supply-pipe, a float-support pivoted in the trough, a rod pivoted to the float-support and extended into the uncovered extension of the trough and an auxiliary fountain fixed to the outside over an aperture in the trough, arranged and combined to operate in the manner set forth for the purposes stated.

CHARLES PELMULDER.

Witnesses:
G. M. PARKER,
W. E. COMSTOCK.